– – –

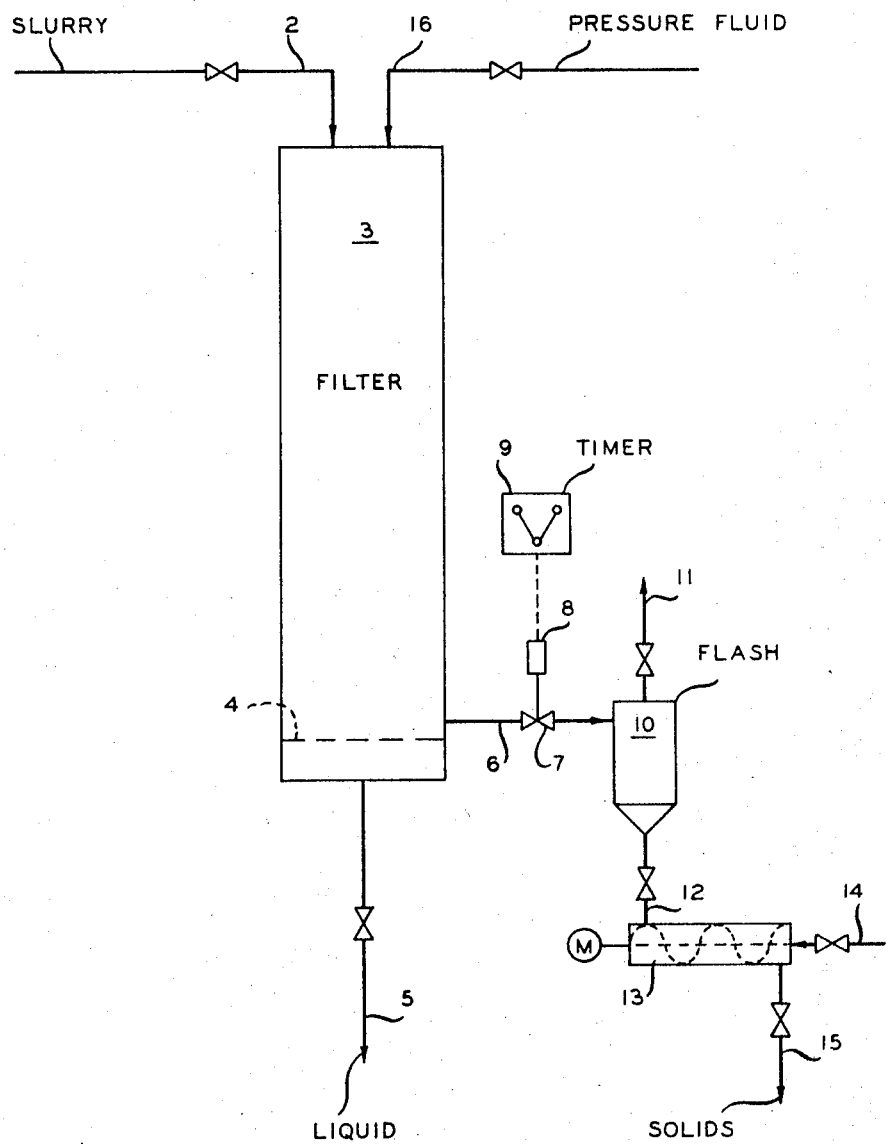

3,468,863
Patented Sept. 23, 1969

3,468,863
METHOD AND APPARATUS FOR REMOVING SOLIDS FROM FILTER
William E. Payne and Carl L. Mariz, Bartlesville, Okla., assignors to Phillips Petroleum Company, a corporation of Delaware
Filed May 15, 1964, Ser. No. 367,633
Int. Cl. C08f 1/88; B01d 37/00
U.S. Cl. 260—93.7                                                          6 Claims

ABSTRACT OF THE DISCLOSURE

A process for recovering particulate thermoplastic solid polymer from a suspension therefor in a liquid comprising the steps of:
(a) Introducing the liquid suspension of said polymer under substantial superatmospheric pressure into a pressure zone partitioned by a filter;
(b) Maintaining a substantial pressure drop across said filter to cause liquid to flow therethrough and particulate polymer to collect on the upstream side of said filter; and
(c) While maintaining substantial superatmospheric pressure in said zone repeatedly, on a short time cycle, alternately opening an outlet in the side of said zone adjacent the upstream side of said filter to flow under the impetus of said superatmospheric pressure in said zone against substantially lower pressure at said outlet and closing said outlet to flow so as to remove said particulate polymer from said filter and from said zone.

---

This invention relates to the filtration of slurries. In one aspect it relates to an improved filter-discharge apparatus. In another aspect, is relates to an improved method for removing solids from a filter element.

In the production and recovery of thermoplastic solids, it is frequently necessary to handle these solids in the form of a slurry or suspension in a liquid. Specifically, in the manufacture of thermoplastic solid polymers of aliphatic olefins, it is frequently necessary to treat, wash, and transport these solids as a slurry in an organic liquid such as a hydrocarbon. Since certain olefin polymers are thermoplastic, they are subject to fusion, sintering, or bridging when handled under pressure. This tendency constitutes a problem in filtration processes wherein it is necessary to separate the thermoplastic solids from accompanying liquids by filtration under pressure. Also, when the liquid component of the slurry is normally gaseous (e.g. propylene), complex blow-down methods are required prior to removal of the solids from the filter element.

An object of this invention is to effect improved recovery of thermoplastic solids. Another object of the invention is to recover thermoplastic solids from a filter. Another object is to provide an improved filter discharge apparatus. Other objects and advantages will become apparent to those skilled in the art upon reading this disclosure.

The accompanying drawing is a flow diagram illustrating one embodiment of this invention.

According to this invention, solids are removed from the filter apparatus by causing the solids to discharge from the filter zone by applying the pressure thereof intermittently against a zone of lower pressure at predetermined intervals of time.

In one embodiment of the invention, in a process wherein a normally solid thermoplastic polymer of an olefin is recovered from accompanying organic liquid by filtration, the polymer is removed from the filter by maintaining the filtration zone under pressure and periodically opening a conduit or valve adjacent the filter element and on the upstream side thereof and causing the solids to discharge in a pulsating manner into a zone of lower pressure.

In another embodiment according to this invention, there is provided apparatus comprising a pressure vessel containing a filter medium and having an inlet on one side of the filter medium and a liquid outlet on the other side thereof, an outlet for solids on said one side of the filter medium and adjacent thereto, an effluent conduit connected with the solids outlet provided with a valve in said solids outlet, and means to open and close said valve at periodic predetermined intervals of time.

As illustrated in the drawing, a slurry of crystalline polypropylene in liquid propylene flows through inlet 2 into filter vessel 3, which is provided with a filter element 4. The filter element can be a screen, a cloth, a bed of particulate inert solids, or other filtration medium known in the art. Filter element 4 retains the solids and allows the liquid propylene to flow through and out liquid outlet 5.

Immediately upstream and adjacent filter element 4 is solids effluent conduit 6 connected with an outlet in the side of vessel 3 and provided with a valve 7 which is alternately opened and closed by motor 8 under the control of timer 9. After a desired amount of solids has accumulated on filter element 4 (valve 7 being previously closed) timer 9 is placed in operation actuating motor 8 and periodically opening valve 7, thus allowing solids accumulated on filter element 4 to flow in a pulsating manner through conduit 6. When the mixture being filtered is a suspension of polypropylene in liquid propylene, the solids withdrawn from the upstream side of filter element 4 through conduit 6 and valve 7 frequently contain approximately equal volumes of liquid propylene and solid polypropylene. This mixture flows into flash zone 10 which is maintained at a reduced pressure causing the propylene to vaporize. The vaporized propylene is withdrawn through outlet 11, recovered in means not shown in the drawing, and reused. The solids recovered in zone 10 flow through conduit 12 into a purge means 13, which can be any known solids conveyor, such as a spiral conveyor. The solids, while flowing through purge means 13, can be contacted with an inert stripping medium such as steam, methane, nitrogen, or other inert material to remove traces of propylene accompanying the polypropylene. Stripping medium is supplied, when desired, through conduit 14. Solids polypropylene is removed as a product of the process through outlet 15.

When the solids being recovered are polypropylene in a suspension in a liquid hydrocarbon such as propylene, the filter zone 3 can be maintained under the autogenous pressure of the system, which can be any suitable pressure for maintaining the propylene in the liquid phase. Under these circumstances, the filter zone 3 can be operated as a continuous or batch filter. When the operation is continuous, timer 9 can be set in operation at any desired frequency so as to maintain a preselected depth of solids on filter element 4.

Alternatively, filter zone 3 can be operated as a batch filter. In this type of operation, the slurry passes through filter zone 3 until a predetermined depth of solid filter cake has accumulated on filter element 4. The filter cake is then washed, e.g., with liquid propylene, to remove any remaining catalyst residue and soluble polymer. Wash propylene, from a source not shown, is supplied through inlet 2. The valves in conduits 2 and 5 are then closed and timer 9 set in operation so as to discharge the accumulated solids through conduit 6 and valve 7 of this flash zone 10. After removal of a desired amount of the polypropylene in this manner, valve 7 is closed, timer 9 taken out of operation, and the filtration cycle resumed.

In another method of operation, particularly adaptable to batch filtration, when a desired amount of polypropylene has accumulated on filter element 4, and has been washed as previously described, conduit 2 is closed, and valved conduit 16 is opened. A pressure fluid, preferably a gas, is then introduced through conduit 16 into filter zone 3 to force adhering liquid through filter element 4 and out through outlet 5 thus drying, i.e. removing adhering liquid propylene, from the accumulated polypropylene. This supply of pressure fluid can be continued for any desired period of time. For example, it can be supplied only long enough to remove most of the decantable liquid, or it can be continued for a sufficient time to remove remaining propylene substantially completely by filtration and vaporization. When the desired amount of liquid has been removed, the pressure of the pressure fluid is maintained in filter zone 3, and timer 9 is placed in operation so that the accumulated, substantially dry solids are removed through outlet 6. In this type of operation, flash zone 10 continues in use to remove any adhering traces of propylene from the surface of the particulate polypropylene. Alternatively, when the drying inside filter zone 3 is substantially complete, the flash zone 10 is operated merely as a collecting hopper.

Timer 9 can be any timing mechanism known in the art. For example, it can be a clockwork mechanism which actuates a switch which completes an electrical circuit.

Motor 8 can also be any conventional valve-operating motor known in the art. For example, it can be a solenoid mechanism which opens and closes valve 7 and can be actuated by the electrical circuit periodically completed or broken by timer 9. These mechanisms are well known in the art.

In a specific embodiment of our invention, polypropylene produced by polymerization in the presence of a diethylaluminum chloride-titanium trichloride-aluminum chloride complex catalyst, and previously contacted with acetyl acetone to form soluble catalyst residues, and the resulting slurry of polypropylene in liquid propylene was passed into a pressure vessel 2 inches in diameter and 12 feet tall provided with a a screen supporting a filter cloth adjacent the lower end. An outlet was provided in the side of the column immediately above the filter element. In the outlet, there was provided a ball valve comprising a rotating sphere having an opening therethrough and actuated by compressed air controlled by a solenoid actuated by a clockwork timing device. The apparatus was adjusted so that the valve remained closed for a period of 10 to 15 seconds and was open for less than 1 second during a cycle. The slurry was fed into the column at the top thereof, and liquid propylene, free of undissolved polypropylene, withdrawn from the bottom outlet. After approximately 6 pounds of polypropylene had accumulated on the filter cloth, it was washed with liquid propylene. The timer was then placed in operation and polypropylene discharged, according to the cycle previously indicated, by release of the vapor pressure of the liquid propylene remaining in the column.

During part of the run, after the washing step, the feed inlet valve was closed, and nitrogen at 130 p.s.i was introduced into the top of the column to remove most of the remaining propylene from the polypropylene. The discharge of the accumulated polypropylene was then begun by closing the liquid outlet valve (line 5) and placing the timer in operation.

In the latter part of the runs illustrated, nitrogen was not used, and the filter column was maintained under the vapor pressure of the system. The polypropylene was then withdrawn with accompanying propylene which was then removed by vaporization. No difficulty of bridging or fusing of the polypropylene was encountered in either method of operation.

The following are data recorded during the wash period of these runs.

| Run No. | Propylene Wash Rate | | Pressure, p.s.i.g.: | | | Weight [2] of Polymer in Filter Bed, lbs. | Remarks. |
|---|---|---|---|---|---|---|---|
| | Feed Rate, g.p.h. | Temp., °F. | Column Top | Column Bottom | ΔP [1] | | |
| 2A | 1.9 | 84 | 205 | 190 | 17 | 6.18 | |
| 2B | 3.9 | 87 | 214 | 185 | 31 | 6.18 | |
| 2C | 5.3 | 85 | 222 | 192 | 32 | 6.18 | |
| 2D | 3.9 | 84 | 220 | 186 | 36 | 6.18 | Dry discharge. |
| 3A | 2.0 | 59 | 205 | 197 | 11 | 5.68 | |
| 3B | 3.9 | 62 | 210 | 190 | 23 | 5.68 | |
| 3C | 5.5 | 68 | 217 | 189 | 31 | 5.68 | |
| 3D | 7.6 | 69 | 223 | 182 | 44 | 5.68 | Slurry discharge. |

[1] Includes static head; 2 p.s.i., Run 2; 3 p.s.i., Run 3.
[2] Bed depth; Runs 2 and 3, 12 ft. Bed compaction measured at end of Run 3 was 17 in.

Filtration of slurries of the type hereinbefore described can be impeded by bridging or partial fusing of the polymer during the pressure filtration. Such impediments cause difficulty in removing the polyolefin from filtration apparatus. However, operation in accordance with our invention avoids difficulties of this type.

While the invention has been described with particular reference to the recovery of polypropylene from admixture with propylene, the invention is not so limited in its broader aspects. The invention is also applicable for recovery of polyethylene from slurries in cyclohexane or normal pentane, polystyrene from slurries thereof in liquid styrene, and recovery of ethylene-1-butene copolymers from slurries thereof in hydrocarbons such as normal pentane. The invention is broadly applicable to the recovery of thermoplastic solids from suspension in accompanying liquids.

We claim:
1. A process for recovering particulate thermoplastic solid polymer from a suspension thereof in a liquid comprising the steps of:
(a) introducing the liquid suspension of said polymer under substantial superatmospheric pressure into a pressure zone partitioned by a filter;
(b) maintaining a substantial pressure drop across said filter to cause liquid to flow therethru and particulate polymer to collect on the upstream side of said filter; and
(c) while maintaining substantial superatmospheric pressure in said zone repeatedly, on a short time cycle, alternately opening an outlet in the side of said zone adjacent the upstream side of said filter to flow under the impetus of said superatmospheric pressure in said zone against substantially lower pressure at said outlet and closing said outlet to flow so as to remove said particulate polymer from said filter and from said zone.

2. A process according to claim 1, wherein said polymer is crystalline polypropylene, said liquid is propylene and said filter zone is operated as a batch filter until a predetermined depth of said polymer is accumulated on said filter, said polymer is then washed, and said polymer is then recovered from said filter zone.

3. A process according to claim 1 wherein said polymer is crystalline polypropylene, said liquid is propylene, said liquid is at least partially removed from accumulated solids on said filter element by application of an inert gas under pressure, said polypropylene is removed from said filter zone under the pressure of said gas, and said polypropylene is recovered in a substantially liquid-free state.

4. The process of claim 1 wherein said polymer is a polyolefin and said liquid is a hydrocarbon.

5. The process of claim 1 wherein said time cycle comprises a closed period in the range of 10 to 15 seconds and a short open period of less than 1 second.

6. A process according to claim 1 wherein said polymer is crystalline polypropylene, said liquid is propylene and said filter zone is operated continuously so as to maintain a preselected depth of said polymer on said filter.

References Cited
UNITED STATES PATENTS

| | | | |
|---|---|---|---|
| 1,139,825 | 5/1915 | Vandercook | 210—409 |
| 3,293,227 | 12/1966 | Boggess et al. | 260—94.9 |

JOSEPH L. SCHOFER, Primary Examiner

S. M. LEVIN, Assistant Examiner

U.S. Cl. X.R.

210—409; 260—88.2, 93.5, 94.9, 96